UNITED STATES PATENT OFFICE.

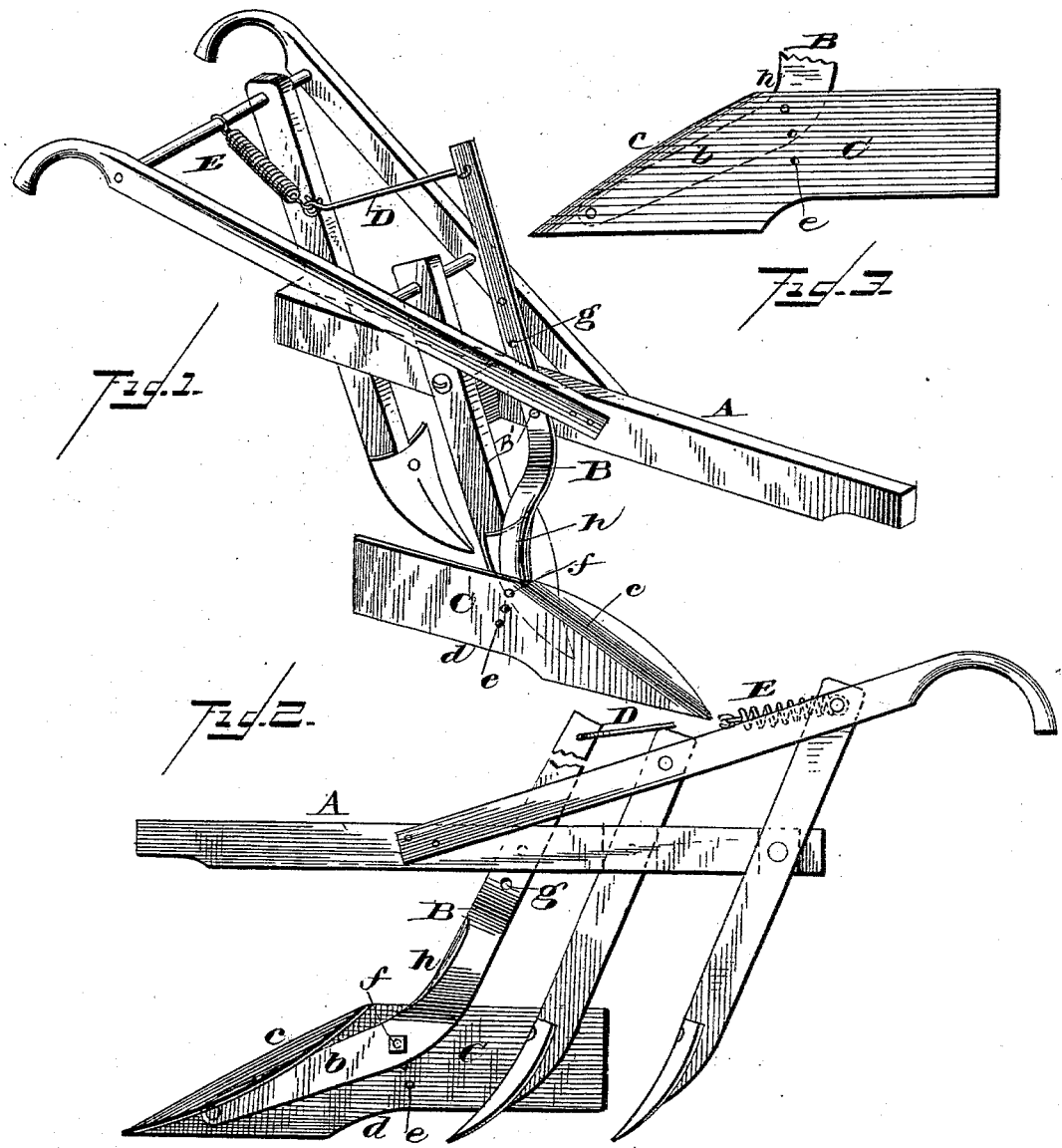

JOHN SHEARER, OF SOUTH BEND, INDIANA.

PLOW-SHIELD.

SPECIFICATION forming part of Letters Patent No. 425,259, dated April 8, 1890.

Application filed August 28, 1889. Serial No. 322,235. (No model.)

*To all whom it may concern:*

Be it known that I, JOHN SHEARER, a citizen of the United States, and a resident of South Bend, in the county of St. Joseph and State of Indiana, have invented certain new and useful Improvements in Plow-Shields; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my device attached to one pattern of shovel-plows. Fig. 2 is a side elevation of the same; and Fig. 3 represents a modification of the device adapted to be attached to the other side of a plow, a portion being broken away.

Nothing is more common in the plowing and cultivating of corn, potatoes, and other similar crops than for the dirt to be thrown on top of the vines, burying a portion of them, and necessitating the stoppage of the cultivator that the farmer may remove the vines by hand. Otherwise the plants are injured by a portion of their tops being allowed to remain under the ground or by being broken off.

My invention relates to attachments for plows or cultivators, and has for its object to provide efficient means for preventing the earth from being thrown upon the tops or vines of the plants, as above referred to. I accomplish this object by the device illustrated in the accompanying drawings, in which like letters of reference denote corresponding parts in all the figures.

It is not my intention to confine the use of my attachment or shield to the particular pattern of plow in connection with which it is shown in the drawings. It can be used with equal advantage with nearly every pattern of cultivator-plow or shovel-plow, and it may be attached to one side of the plow, as shown in the drawings, or two shields may be attached to the same plow or cultivator, one upon each side.

The shield shown in Figs. 1 and 2 is intended to be used on the right side of the plow; but it will be seen that a like construction may be employed in a shield for the left side, as shown in Fig. 3.

Referring to the drawings, the letter A designates the beam of a cultivator or shovel plow, on which is hinged the standard B by means of the pivots B'. Below the point of adjustment to the beam the standard is curved outwardly and then forwardly, forming a sort of a foot $b$. To this foot is bolted the shield C. The construction or shape of this shield is best illustrated by reference to the drawings. It will be seen that the top is curved or rounded inwardly, as shown at $c$, and that the bottom is cut away, as shown at $d$. The shield is provided with a series of perforations or bolt-holes $e$, in any one of which the bolt $f$ may be placed. The standard B also has several holes $g$, through any one of which it may be attached to the beam A. The upper end of the standard is connected by means of a rod D and coiled spring E to the round connecting the handles.

The operation of my invention is as follows: It will be seen that the point of the shield runs considerably in advance of the shovel or plow proper and that it rests at a little distance to the side of the plow, also that the point $d$, at which the shield is cut away, rests nearly opposite the plow or shovel. As the plow moves along the vines are caught and raised by the curved portion $c$ passing under them. At the same time the dirt is thrown from the shovel against the plant at the point $d$, where said shield is cut away. The top of the shield is curved and made smooth, in order that it may not cut or injure the vines, and for the same reason the front side of the standard at the point $h$, near where it is fastened by the bolt $f$, is rounded and curved, in order that it may not catch or cut the vines. If it is desired that the point of the shield shall be relatively more depressed or raised, it is adjusted by placing the bolt $f$ in a different one of the series of bolt-holes $e$. The entire shield may be raised or lowered by means of the holes $g$ of the standard by which said standard is fastened to the beam of the cultivator or plow. The spring E is provided in order to give a certain amount of play to the shield in case it strikes small stones or other slight obstructions. By this means when the point of the shield strikes a small stone it will drop, pass under, raise the stone, and return to its normal position by the tension of the spring.

The standard B without departing from the spirit of the invention may be bent or formed in various ways in order that the shield may be attached to plows or cultivators of different patterns.

It will be seen that the shields shown in Figs. 2 and 3 are made to face in opposite directions, but are symmetrical in form and construction and are adapted to be applied to the right and left sides, respectively, of the cultivator or plow. In some cases it may be found desirable to bolt the standard B firmly to the beam of the plow and dispense with the upward extension, the rod D, and coiled spring E.

Having thus described my invention, I claim and desire to secure by Letters Patent of the United States—

1. The combination, with the beam A and pivoted standard B, provided with a series of holes $g$, of the shield C, provided with a series of holes $e$, by which it is adjustably secured to the upright B, said shield consisting of a metal plate curved inwardly at $c$ and having its bottom cut away at $d$, substantially as described.

2. In a plow, the combination of the beam A, the standard B, pivoted thereto, the shield C, having bolt-holes $e$ and curved inwardly at $c$ and cut away at $d$, the bar D, secured to standard B, and the coiled spring E, connected to the bar D and to the plow-handles, substantially as described.

In testimony that I claim the foregoing as my own I have hereunto affixed my signature in presence of two witnesses.

JOHN SHEARER.

Witnesses:
JOHN GALLAGHER,
WM. RUPEL.